3,657,431
TREATING OF INFLAMMATION WITH SUBSTITUTED PHENYLTHIOSALICYLIC ACIDS
Tsung-Ying Shen, Gordon L. Walford, and Bruce E. Witzel, Westfield, N.J., assignors to Merck & Co., Inc., Rahway, N.J.
No Drawing. Filed June 25, 1969, Ser. No. 836,611
Int. Cl. A61k 27/00
U.S. Cl. 424—230
5 Claims

ABSTRACT OF THE DISCLOSURE

New substituted phenylthiosalicyclic acids and non-toxic pharmaceutically acceptable salts, esters, anhydrides, and amides derived therefrom. The substituted phenylthiosalicylic acids described herein have anti-inflammatory, anti-pyretic, and analgesic activity. Also included are methods for preparing said phenylthiosalicylic acid compounds.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally, this invention relates to new substituted phenylthiosalicyclic acid compounds and processes for producing the same. These compounds are useful in that they have anti-inflammatory activity and are effective in the prevention and inhibition of edema and granuloma tissue formation. In addition, some of them have a useful degree of anti-pyretic and analgesic activity.

DESCRIPTION AND PREFERRED EMBODIMENTS

This invention relates to new substituted phenylthiosalicylic acids and processes for producing the same. More specifically, this invention relates to substituted phenylthiosalicylic acids, esters, amides, anhydrides and non-toxic pharmaceutically acceptable salts thereof. Still more specifically, this invention relates to compounds having the following general formula:

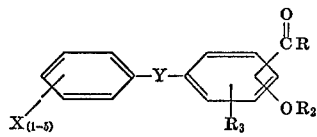

(I)

wherein:
R may be hydroxy, amino, loweralkoxy (such as methoxy, ethoxy, butoxy, pentoxy, etc.), loweralkylamino (methylamino, propylamino, pentylamino, etc.), di(loweralkyl)amino (dimethylamino, dibutylamino, propylpentylamino, etc.), diloweralkylaminoloweralkylamino, phenylamino, diloweralkylaminoloweralkoxy, hydroxyloweralkoxy (3 - hydroxypropoxy, 2-hydroxybutoxy, 4 - hydroxybutoxy, etc.), polyhydroxyloweralkoxy (2,3 - dihydroxypropoxy, 2,3,4,5,6-pentahydroxyhexyloxy, etc.), loweralkoxyloweralkoxy (ethoxyethoxy), phenylloweralkoxy (benzyloxy, phenethoxy, etc.), phenoxy, substituted phenoxy (such as loweralkoxyphenoxy, diloweralkylaminophenoxy, loweralkanoylaminophenoxy, carboxyphenoxy, halophenoxy and carboloweralkoxyphenoxy), hydrazino, morpholino, piperidino, pyrrolidino, or hydroxyloweralkylamino;

$R_2$ may be hydrogen, acyl (preferably lower acyl such as formyl, acetyl, propionyl, butyryl, etc.), alkyl (preferably loweralkyl such as methyl, ethyl, propyl, isopropyl, butyl, pentyl, etc.), or alkoxycarbonyl (preferably loweralkoxy carbonyl such as methoxycarbonyl, ethoxycarbonyl, hexoxycarbonyl, etc.);

$R_3$ may be hydrogen, halogen (such as chloro, bromo, fluoro, or iodo, preferably fluoro or chloro), haloalkyl (preferably haloloweralkyl such as trifluoromethyl, etc.), alkyl (preferably loweralkyl, such as methyl, ethyl, propyl, isopropyl, butyl, pentyl, etc.), cycloalkyl (cyclopropyl, cyclobutyl, cyclopentyl, cyclohexyl and cycloheptyl), or alkoxy (preferably loweralkoxy such as methoxy, ethoxy, isopropoxy or butoxy, etc.);

X may be hydrogen, alkyl (preferably loweralkyl, such as methyl, ethyl, propyl, isopropyl, butyl, pentyl, etc.), hydroxy, alkoxy (preferably loweralkoxy such as methoxy, acetoxy, isopropoxy or butoxy), acyloxy (such as benzyloxy, acetoxy or propionoxy), halogen (such as chloro, bromo, fluoro or iodo, preferably fluoro or chloro), haloalkyl (preferably haloloweralkyl (such as chloro, bromo, fluoro or iodo, preferably (preferably loweralkylamino such as methylamino, propylamino, pentylamino, etc.), diloweralkylamino (dimethylamino, dibutylamino, propylpentylamino, etc.), acylamino (preferably loweracylamino such as formylamino, acetylamino, propionylamino, butrylamino, etc.), mercapto alkylmercapto (preferably loweralkylmercapto such as methylmercapto, ethylmercapto, etc.), alkylsulfinyl (preferably loweralkylsulfinyl such as methylsulfinyl, ethylsulfinyl, butylsulfinyl, etc.), alkylsulfonyl (preferably loweralkylsulfonyl such as methylsulfonyl, ethylsulfonyl, butylsulfonyl, etc.), sulfonamido, sulfonylamido, alkylaminoalkyl (preferably loweralkylaminoloweralkyl such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercapto, ethylmercaptopropyl, etc.), cyano, carboxy, carboalkoxy (carbomethoxy, carboethoxy, etc.), carbamoyl, aryl (such as phenyl, halophenyl, tolyl, salicyl), aralkyl such as benzyl, or aryloxy; and Y may be thio, sulfinyl or sulfonyl;
provided that the $OR_2$ group is always ortho to the $$\overset{O}{\underset{\|}{C}}-R$$

group.

Representative compounds of this invention are:
5-(p,o, or m-fluorophenylthio)-salicylic acid;
4-(p,o, or m-fluorophenylthio)-salicylic acid;
5-(p,o, or m-trifluoromethylphenylthio)-salicylic acid;
4-(p,o, or m-trifluoromethylphenylthio)-salicylic acid;
5-(p,o, or m-fluorophenylsulfinyl)-salicylic acid;
4-(p,o, or m-fluorophenylsulfinyl)-salicylic acid;
5-(p,o o, or m-trifluoromethylphenylsulfinyl)-salicyclic acid;
4-(p,o, or m-trifluoromethylphenylsulfinyl)-salicylic acid;
5-(p,o, or m-fluorophenylsulfonyl)-salicylic acid;
4-(p,o, or m-fluorophenylsulfonyl)-salicylic acid;
5-(p,o, or m-trifluoromethylphenylsulfonyl)-salicylic acid;
4-(p,o, or m-trifluoromethylphenylsulfonyl)-salicylic acid.

This invention also relates to a method of treating inflammation in patients (animal or human) using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have antipyretic and analgesic activity and would be administered and used in the same manner and in the same dosage ranges as if they were being used to treat inflammation as discussed further on by orally, rectally, parenterally, or topically administering to patients a composition of a compound of this invention, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension. Suppositories for rectal administration and gels for topical administration may be prepared in conventional manners.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The acid compounds of this invention may be prepared by reacting a substituted benzenethiol with a haloanisole to form a phenylthioanisole. The phenylthioanisole is then demethylated in a conventional manner to form a phenylthiophenol which is carboxylated in a conventional manner to form a phenylthiosalicylic acid, as for example, by heating the appropriate substituted phenylthiophenol under pressure with carbon dioxide gas. The product can then be isolated from the reaction mixture by methods known in the art. The temperature at which the carboxylation reaction can take place is from 50° to 300° C. The reaction can also take place at from atmospheric pressure to high pressure, preferably however at 200° C. and about 1600 p.s.i. pressure.

The phenylthioanisole compounds may be oxidized to form methoxydiphenylsulfoxides and methoxydiphenylsulfones, which are then demethylated and carboxylated as described above to form the corresponding phenylsulfinyl salicylic and phenylsulfonyl-salicylic acids, or by oxidation of the phenylthio-salicylic acids.

The compounds of this invention wherein R is a group such that an ester is the final compound (i.e. R is alkoxy) are prepared by an esterification procedure using an esterifying agent containing the appropriate R group. For example, the carboxylic acid compounds of this invention may be reacted with the appropriate lower alkanol (preferably methanol) at elevated temperatures in the presence of a strong acid such as hydrochloric acid, sulfuric acid, p-toluene-sulfonic acid and the like to form the desired ester.

The compounds of this invention wherein R is a group such that an amide is the final compound (i.e. R is amino) may be prepared by any suitable amidation reaction. For example, the carboxylic acid compound (preferably the methyl or ethyl ester) may be reacted with ammonia, ammonium hydroxide, or an amine compound, at any suitable temperature (room temperature to reflux). When the amino group is desired, it is preferred to carry out the reaction with ammonia in a bomb at temperatures above 100° C. to form the desired R (amino) compound. Preferably, when an amide is desired which is derived from an amino acid, the following reaction sequence is followed: The carboxylic acid final compound is reacted with isobutyl chlorocarbonate to form the mixed anhydride. This compound is in turn reacted with the desired amino acid ester and subsequently hydrolyzed to form the desired amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhydride of this invention may be prepared by any of the well-known procedures in the art.

The final compound, wherein $R_2$ is lower alkyl (preferably methyl), may be prepared by any appropriate alkylation reaction. For example, the corresponding hydroxy benzoic acid, ester, or amide (preferably the ester), may be reacted with a di(lower alkyl)sulfate (preferably dimethyl sulfate) in the presence of a base (such as an alkali carbonate) at any suitable temperature (room temperature to reflux but preferably at or near reflux) with subsequent acidification of the reaction mixture, such as with hydrochloric acid, sulfuric acid, and the like, to form the desired $R_2$ compound.

The following examples are presented to further illustrate the invention:

EXAMPLE 1

The preparation of m-phenylthioanisole

Sodium wire (1.2 g.) is dissolved in absolute ethanol (15 ml.), benzenethiol (7 g.) added, and the excess alcohol removed. Copper powder (0.2 g.) and m-iodoanisole (14 g.) is added and the mixture heated at ca. 240° (bath temperature) for three hours. The mixture is cooled, benzene added, the mixture heated, filtered, and the filtrate concentrated in vacuo to a residue. Distillation or chromatography of the residue on a silica gel column using an ether-petroleum ether (v./v. 0–60% ether) system yields m-phenylthioanisole.

When o-, m-, or p-chlorobenzenethiol, o-, m-, or p-fluorobenzenethiol, o-, m-, or p-nitrobenzenethiol, o-, m-, or p-methylbenzenethiol, o-, or p-methylaminobenzenethiol, o-, m-, or p-dimethylamino-benzenethiol, o-, m-, or p-phenylbenzenethiol, p-mercaptobenzotrifluoride, p-mercaptoacetophenone, 4-mercaptodiphenylmethane, methyl p-mercaptobenzoate, p-phenoxybenzenethiol, 2,4-, 2,5-, 3,4-, or 3,5-dichlorobenzenethiol, 2,4,5-trichlorobenzenethiol, 2,4,6-trimethylbenzenethiol, 2,3,5,6-tetramethylbenzenethiol, pentachlorobenzenethiol, p-methylsulfonylbenzenethiol or 4-chloro-2-nitrobenzenethiol is used in place of benzenethiol in the above procedure, the corresponding 3-(substituted phenylthio)anisole is obtained.

When the above benzenethiols are used and p-iodoanisole, 4-bromo-3-trifluoromethylanisole, 4-benzyloxy-2-bromoanisole, 4-bromo-3-methylanisole, or 3-chloro-4-iodoanisole is used in place of the m-iodoanisole in the above procedure, the corresponding (substituted phenylthio)-substituted anisoles are obtained.

EXAMPLE 2

The preparation of p-(methylthio)-benzotrifluoride

A stainless steel lined shaker is charged with p-(methylthio)benzoic acid (0.05 m.) under a nitrogen atmosphere, the system cooled to Dry-Ice temperatures, and sulfur tetrafluoride (ca. 0.25 m.) condensed into the tube. The mixture is then heated at 120° C. for six hours, cooled, vented, the residual material taken up in ether, filtered, and concentrated. Chromatography of the residue on a silica gel column using an ether-petroleum ether system (v./v. 0–30% ether), or distillation of the residue yields p-methylthiobenzotrifluoride.

EXAMPLE 3

The preparation of p-mercaptobenzotrifluoride

A mixture of p-methylthiobenzotrifluoride (5 g.) and pyridine hydrochloride (25 g.) under a nitrogen atmosphere is placed in an oil-bath set at 230° C., kept there 10 minutes, removed from the bath, cooled, and extracted with ether. The ether extracts are washed with water, dried, and the residue obtained upon removal of the ether distilled or chromatographed on a silica gel column using an etherpetroleum ether (v./v. 0–50% ether) system as eluant giving p-mercaptobenzotrifluoride.

Other standard demethylation procedures such as boron tribromide, may also be used in place of the pyridine hydrochloride.

EXAMPLE 4

The preparation of 4-mercaptodiphenylmethane

To a cooled solution of 4-hydroxydiphenylmethane (0.06 m.) in 45 ml. of dimethylformamide is added, in small portions, sodium hydride (0.06 m. of a 50% mineral-oil dispersion). After hydrogen evolution has ceased, the mixture is cooled to 10° C. and dimethylthiocarbamoyl chloride (0.08 m.) is added all at once. After the initial reaction has subsided, the mixture is heated slowly to 80° C., cooled and poured into 200 ml. of potassium hydroxide (1%) solution. The mixture is saturated with sodium chloride and extracted well with benzene, the benzene washed well with water, dried, filtered and concentrated to the crude thiocarbamate.

The thiocarbamate is then heated under a nitrogen atmosphere for 20 minutes at 250° C., the mixture cooled, taken up in de-aerated methanol-10% aqueous sodium hydroxide solution, heated under a nitrogen atmosphere until hydrolysis is complete (tlc), cooled, acidified with 2.5 N hydrochloric acid, and the aqueous mixture extracted well with benzene. Chromatography of the benzene extracts on a silica gel column using an ether-petroleum ether system (v./v. 0–50% ether) as eluant yields 4-mercaptodiphenylmethane.

EXAMPLE 5

The preparation of 4-(p-fluorophenylthio)-3-methoxyphenol

A mixture of 5-benzyloxy-2-(p-fluorophenylthio)-anisole (0.05 m.), methanol (500 ml.) and 10% palladium on charcoal (2 g.) is reduced in a hydrogen atmosphere (40 p.s.i.) at room temperature. When the theoretical amount of hydrogen has been absorbed, the mixture is filtered and the solvent removed in vacuo to yield 4-(p-fluorophenylthio)-3-methoxy-phenol.

When the other substituted benzyloxyanisoles of Example 1 are used in place of 5-benzyloxy-2-(p-fluorophenylthio)-anisole, above, the corresponding 4-(x-phenylthio)-3-methoxyphenols are obtained.

EXAMPLE 6

The preparation of substituted phenols

When the substituted anisoles of Example 1 are reacted with pyridine hydrochloride as per Example 3, the corresponding substituted phenols are obtained.

EXAMPLE 7

The preparation of 5-(p-fluorophenylthio)-salicylic acid

An intimately ground mixture of 4-(p-fluorophenylthio)-phenol (5 g.) and anhydrous potassium carbonate (15 g.) is heated at 200° C. in a 1200–1400 p.s.i. carbon dioxide atmosphere for eight hours. The mixture is cooled, added to water (300 ml.), stirred, filtered, and the filtrate acidified with dilute hydrochloric acid to yield 5-(p-fluorophenylthio)-salicylic acid.

When the phenols of Examples 5 and 6, and 2-chloro-4-(p-nitrophenylsulfonyl)-phenol, 3-chloro-4-(p-nitrophenylsulfonyl)-phenol, 2-chloro-4-(p-aminophenylthio)-phenol, 2-chloro-4-phenylsulfonylphenol and 2-chloro-4-(p-methylphenylsulfonyl)-phenol are used in place of 4-(p-fluorophenylthio)-phenol in the above example, the corresponding salicylic acids are obtained.

EXAMPLE 8

The preparation of methyl 5-(p-acetylphenylthio)-salicylate

When methyl 5-iodo-o-anisate and p-mercaptoacetophenone are condensed as per Example 1, and the resulting 5-(p-acetylphenylthio)-anisate demethylated as per Example 3, methyl 5-(p-acetylphenylthio)-salicylate is obtained.

When the 4-iodo isomer is used in place of the 5-isomer, above methyl 4-(p-acetylphenylthio)-salicylate is obtained.

EXAMPLE 9

The preparation of 5-(p-carboxyphenylthio)-salicylic acid

A mixture of 5-(p-carbomethoxyphenylthio)-salicylic acid (0.005 m.), methanol (50 ml.), sodium hydroxide (0.05 m.) and water is allowed to stir at room temperature for 20 hours. The mixture is filtered after excess water (ca. 100 ml.) is added, and the filtrate acidified with 2.5 N hydrochloric acid to yield 5-(p-carboxyphenylthio)-salicylic acid.

EXAMPLE 10

The preparation of methyl 5-(p-chlorophenylthio)-salicylate

To a solution of anhydrous methanol (100 ml.) containing anhydrous hydrogen chloride (or concentrated sulfuric acid) is added 5-(p-chlorophenylthio)-salicylic acid (5 g.) and the resultant mixture heated for several hours. The solvent is removed in vacuo, the residual material partitioned between chloroform dilute sodium bicarbonate solution, the chloroform layers dried, filtered and concentrated in vacuo to form methyl 5-(p-chlorophenylthio)-salicylate.

When ethanol is used in place of methanol in the above esterification, the corresponding ethyl ester is obtained. Esterification is also achieved using diazomethane.

When the salicylic acids of Example 7 are used in place of 5-(p-chlorophenylthio)-salicylic acid, the corresponding esters are obtained. With basic substituents, an equivalent amount of acid catalyst must be added.

EXAMPLE 11

The preparation of 2-acetoxy-5-(p-chlorophenylthio)-benzoic acid

A mixture of 5 - (p-chlorophenylthio) - salicylic acid (0.04 m.), pyridine (15 ml.) and acetic anhydride (28 ml.) is heated on the steam cone for 2 hours, protected from moisture. On cooling, the mixture is added to a stirred 500 ml. portion of water, the aqueous system extracted with chloroform, the extracts washed with dilute hydrochloric acid, water, and then dried. Concentration of the filtered solution yields 2-acetoxy-5-(p-chlorophenylthio)-benzoic acid.

EXAMPLE 12

The preparation of methyl 5-(p-chlorophenylthio)-o-anisate

A mixture of 5-(p-chlorophenylthio)-salicylic acid (5 g.), silver oxide (25 g.), methyl iodide (15 g.) and benzene (10 ml.) is heated for 20 hours, filtered, the cake washed well with benzene, the combined filtrates concentrated in vacuo, and the residue chromatographed on a silica gel column using an ether-petroleum ether system (v./v. 0–60% ether) as eluant to give methyl 5-(p-chlorophenylthio)-o-anisate.

When the other chloro, fluoro, methyl, nitro, phenyl, phenoxy, methoxy and benzyl substituted phenylthiosalicylic acids of Example 7 are used in the above process, the corresponding o-methyl salicylates are obtained.

EXAMPLE 13

The preparation of methyl 5-(p-aminophenylthio)-salicylate

A mixture of pure methyl 5-(p-nitrophenylthio)-salicylate (0.01 m.) in methanol-dioxane (1:1) (200 ml.) is reacted with hydrogen at room temperature (40 p.s.i.) in the presence of 10% palladium on charcoal (1.0 g.). The mixture is filtered, the cake washed well with methanol, the filtrate evaporated in vacuo, the residue chromatographed on a silica gel column using a methanol-methylene chloride system (v./v. 0–30% methanol) as eluant to yield methyl 5-(p-aminophenylthio)-salicylate.

When methyl 5-(p-nitrophenylthio)-o-anisate is used in the above procedure, methyl 5-(p-aminophenylthio)-o-anisate is obtained.

EXAMPLE 14

The preparation of methyl 5-(p-hydroxyphenylthio)-o-anisate

A mixture of methyl 5-(p-aminophenylthio)-o-anisate (0.2 m.), water (600 ml.) and concentrated sulfuric acid (25 ml.) is cooled to 10° C. and a solution of sodium nitrite (0.21 m.) in a minimum of water is added gradually. When the presence of free nitrous acid is detected (starchiodide paper), the addition is stopped, and the diazotization mixture is allowed to warm to room temperature, then heated on a steam-bath until there is no more nitrogen evolution. The mixture is cooled, extracted well with chloroform, the combined chloroform layer dried, concentrated to a residue, methanol (300 ml.) added plus 0.5 ml. concentrated sulfuric acid, the mixture heated gently for several hours, the mixture concentrated in vacuo to remove most of the methanol, the residue partitioned between chloroform-dilute sodium bicarbonate solution, the chloroform layer dried, filtered and concentrated to a residue. Chromatography of the residue on a silica gel column using an ether-petroleum ether (v./v. 0–100% ether) system as eluant yields methyl 5-(p-hydroxyphenylthio)-o-anisate.

EXAMPLE 15

The preparation of methyl 5-(p- hydroxyphenylthio)-salicylate

When methyl 5-(p-hydroxyphenylthio)-o-anisate is reacted with pyridine hydrochloride as per Example 3, methyl 5-(p-hydroxyphenylthio)-salicylate is obtained.

EXAMPLE 16

The preparation of 2-acetoxy-5-(p-acetoxyphenylthio)-benzoic acid

When 5 - (p - hydroxyphenylthio)-salicylic acid (from basic hydrolysis of the methyl salicylate, Example 17) is reacted with excess acetic anhydride and pyridine as per Example 11, 2 - acetoxy - 5 - (p-acetoxyphenylthio)-benzoic acid is obtained.

When 5 - (p - aminophenylthio) - salicylic acid (from Example 15) is treated similarly, 5 - (p - acetamidophenylthio) - 2 - acetoxybenzoic acid is obtained.

EXAMPLE 17

The preparation of 5-(p-benzyloxyphenylthio)-salicylic acid

A mixture of 5 - (p - hydroxyphenylthio) - salicylic acid (0.01 m.), anhydrous potassium carbonate (0.02 m.) and anhydrous methanol (50 ml.) is stirred for 30 minutes protected by a calcium chloride drying tube. Benzyl chloride (0.02 m.) is added, the mixture refluxed for 6 hours, potassium hydroxide (2 g.) and water (100 ml.) added, the mixture refluxed one hour, filtered cold, acidified with dilute hydrochloric acid, the acid collected and purified via recrystallization or chromatography of its methyl ester to yield 5 - (p-benzyloxyphenylthio)-salicylic acid.

EXAMPLE 18

The preparation of 5-(p-methoxyphenylthio)-o-anisic acid

To a mixture of methyl 5 - (p-hydroxyphenylthio)-o-anisate (0.01 m.) in 2 N sodium hydroxide solution is added dimethyl sulfate (0.03 m.) in small portions over two hours, the mixture being kept basic throughout the addition. Water is added, the mixture filtered, the filtrate acidified and 5 - (p-methoxyphenylthio)-o-anisic acid collected.

When diethylsulfate is used in place of methylsulfate, 5-(p-ethoxyphenylthio)-o-anisic acid is obtained.

EXAMPLE 19

The preparation of methyl 5-(p-cyanophenylthio)-salicylate

A mixture of methyl 5-(p-chlorophenylthio)-salicylate (0.02 m.), cuprous cyanide (0.03 m.), and N-methylpyrrolidone is de-aerated, covered with a nitrogen atmosphere and heated slowly to 180° C., kept at this temperature for 3 hours, allowed to cool, partitioned between chloroform-7% hydrochloric acid containing ferric chloride (0.03 m.), the chloroform layer separated, dried, filtered, and concentrated in vacuo to a residue. The residue is chromatographed on a silica gel column using an etherpetroleum ether system (v./v. 5–50% ether) as eluant to yield methyl 5-(p-cyanophenylthio)-salicylate.

EXAMPLE 20

The preparation of 5-(p-carbamylphenylthio)-salicylic acid

A mixture of 5 - (p - cyanophenylthio)-salicylic acid (0.002 m.) and polyphosphoric acid (5 ml.) is heated on a steam cone for one hour, cooled, added to ice-water, the aqueous layer extracted well with chloroform, the chloroform layer concentrated to a residue, the residue heated in methanol-aqueous bicarbonate to hydrolyze any ester or anhydride formed, water added, and the mixture filtered and acidified to yield 5 - (p-carbamylphenylthio)-salicylic acid.

EXAMPLE 21

The preparation of p-(p-methylthiophenylthio)-anisole

When p-methylthiobenzenethiol and p-bromoanisole are heated with copper as per Example 1, p-(p-methylthiophenylthio)-anisole is obtained.

When m- and o-methylthiobenzenethiol are used in place of the p-isomer in the above reaction, the corresponding m- and o-isomers are obtained.

EXAMPLE 22

The preparation of 3,4-hydroxy-4'-mercaptophenylsulfide

When p - (p - methylthiophenylthio) - anisole (5 g.) is heated with pyridine hydrochloride (30 g.) as in Example 3, 4-hydroxy-4'-mercaptophenylsulfide is obtained.

When the o- and m-methylthio isomers are used in the above reaction, the corresponding mercapto phenylsulfides are obtained.

EXAMPLE 23

The preparation of p-(4-methylthiophenylthio)-phenol

A mixture of 4 - hydroxy - 4' - mercaptophenyl sulfide (0.01 m.) in a de-aerated aqueous potassium hydroxide solution (0.01 m.) is treated with dimethylsulfate (0.01 m.) at room temperature over one hour, the mixture acidified, extracted well with ether, and the dried ether extracts chromatographed on a silica gel column using an etherpetroleum ether system (v./v. 0–30% ether) as eluant yielding p-(4 - methylthiophenylthio)-phenol.

EXAMPLE 24

The preparation of 5-(p-methylthiophenylthio)-salicylic acid

When p-(4-methylthiophenylthio)-phenol is carbonated as per Example 7, 5-(p-methylthiophenylthio)-salicylic acid is obtained.

EXAMPLE 25

The preparation of 5-(p-mercaptophenylthio)-salicylic acid

When 5 - (p - methylthiophenylthio)-salicylic acid is heated with pyridine hydrochloride as per Example 3, 5-(p-mercaptophenylthio)-salicylic acid is obtained.

EXAMPLE 26

The preparation of 5-(p-methylsulfinylphenylthio)-salicylic acid

To an ice-cooled solution of 5-(p-methylthiophenylthio)-salicylic acid (0.01 m.) in methanol-acetone is added a solution of sodium metaperiodate (0.01 m.) in a minimum of water, and the mixture stirred at 0–8° C. until precipitation of sodium iodate is completed. The iodate is removed by filtration, the solvents removed in vacuo, and the residue taken up in chloroform and ether. The combined organic extracts are dried, filtered and concentrated. Purification of the 5-(p-methylsulfinylphenylthio)-salicylic acid is affected via recrystallization or chromatography (silica gel) of its methyl ester.

EXAMPLE 27

The preparation of methyl 2-acetoxy-5-(p-bromomethylphenylthio)-benzoate

A mixture of methyl 5-(p-methylphenylthio)-2-acetoxybenzoate (prepared from the corresponding acid and diazomethane) (0.05 m.), N-bromosuccinimide (0.05 m.) (purified just before use by pumping out at 0.5 mm. over palladium on charcoal), carbon tetrachloride (500 ml.) and dibenzoyl peroxide (0.002 m.) is refluxed gently for 3 hours, cooled, the succinimide removed by filtration, and the solvent removed in vacuo to yield crude methyl 2-acetoxy-5-(p-bromomethylphenylthio)-benzoate.

EXAMPLE 28

The preparation of methyl 5-(p-hydroxymethylphenylthio)-salicylate

A mixture of methyl 2-acetoxy-5-(p-bromomethylphenylthio)-benzoate (0.01 m.), silver acetate (0.01 m.) and acetic acid (30 ml.) is heated for five hours, cooled, filtered, and the filtrate concentrated in vacuo to a residue of crude methyl 2-acetoxy - 5 - (p-acetoxymethylphenylthio)-benzoate. Anhydrous methanol (50 ml.) and p-toluene-sulfonic acid (0.3 g.) is added, the mixture refluxed gently for three hours, concentrated, the residue distributed between chloroform-water, the chloroform layer dried, concentrated, and the contents chromatographed on a silica gel column using an ether-petroleum ether system (v./v. 0–90% ether) as eluant to yield methyl 5-(p-hydroxymethylphenylthio)-salicylate.

When potassium thiolacetate is used in place of silver acetate in the above reaction, methyl 5-(p-mercaptophenylthio)-salicylate is obtained.

EXAMPLE 29

The preparation of methyl 5-(p-methoxymethylphenylthio)-salicylate

Methyl 2 - acetoxy - 5 - (p - bromomethylphenylthio)-benzoate (0.01 m.) is added to a stirred solution of sodium methoxide (0.02 m.) in anhydrous methanol, the mixture refluxed gently for one hour, cooled a trace of dilute hydrochloric acid added to neutralize the mixture, the solvents removed in vacuo, and the residue chromatographed on a silica gel column using an ether-petroleum ether system as eluant yielding methyl 5-(p-methoxymethylphenylthio)-salicylate.

When potassium methylmercaptide is used in place of sodium methoxide, methyl 5-(p-methylthiomethylphenylthio)-salicylate is obtained.

EXAMPLE 30

The preparation of methyl 5-(p-aminomethylphenylthio)-salicylate hydrochloride

Methyl 5-(p-cyanophenylthio)-salicylate (0.005 m.) in acetic acid (50 ml.) is reduced at room temperature under a 40 p.s.i. hydrogen atmosphere, using 3 g. of platinum oxide as a catalyst. When the theoretical amount of hydrogen is consumed, the mixture is filtered, the solvent removed in vacuo, the residue taken up in a chloroform-ether mixture, filtered, ethereal hydrogen chloride added and the methyl 5-(p-aminomethylphenylthio)-salicylate hydrochloride collected.

EXAMPLE 31

The preparation of 5-(p-dimethylaminomethylphenylthio)-salicylate

A mixture of methyl 5-(p-aminomethylphenylthio)-salicylate hydrochloride (0.004 m.), 37% formaldehyde (6 ml.), dried 1,2-dimethoxyethane (80 ml.), glacial acetic acid (50 ml.) and 10% palladium on charcoal (3 g.) is treated with hydrogen (40 p.s.i.) at room temperature. When hydrogen uptake is completed, the mixture is filtered, the cake washed well with fresh dimethoxyethane, the combined filtrates distributed between chloroform-dilute sodium bicarbonate solution, the chloroform layer dried, filtered, concentrated, and the residue chromatographed on a silica gel column using an ether-petroleum ether system as eluant to yield methyl 5-(p-dimethylaminomethylphenylthio)-salicylate.

EXAMPLE 32

The preparation of methyl 5-(p-chlorophenyl-sulfinyl)-salicylate

To a solution of methyl 5-(p-chlorophenylthio)-salicylate (0.01 m.) in acetone-methanol (1:1) (200 ml.) is added sodium metaperiodate (0.01 m.) in a minimum of water, and the mixture allowed to stir at room temperature for an extended period of time. When t.l.c. indicates no further sulfide present, the reaction mixture is filtered, the filtrate concentrated in vacuo, the residue taken up in anhydrous acetone, filtered, and concentrated in vacuo to methyl 5-(p-chlorophenylsulfinyl)-salicylate. Further purification is accomplished via chromatography (silica gel).

When the methyl esters of the substituted phenylthio-salicylic acids of Example 10 (excluding the alkylamino substituted ones) are reacted with metaperiodate as above, the corresponding methyl substituted - phenylsulfinyl salicylates are obtained.

The reaction may also be done on the free acids.

EXAMPLE 33

The preparation of 4-fluoro-4'-methoxydiphenylsulfone

A mixture of 4-fluoro-4'-methoxyphenylsulfide (3 g.) in acetic acid is treated with a warm solution of potassium permanganate (theoretical amount) for 15 minutes, sulfur dioxide passed in to decolorize the mixture, the mixture filtered, the cake washed well with methanol, the combined filtrates concentrated to a residue, the residue eluted with chloroform, the chloroform extracts chromatographed on a silica gel column using an ether-petroleum ether system (v./v. 0–70% ether) as eluant to yield 4-fluoro-4'-methoxydiphenylsulfone.

When the other substituted phenylsulfides of Example 1 are used in the above reaction (excluding the alkylamine derivatives), the corresponding sulfones are obtained.

EXAMPLE 34

The preparation of phenylsulfonylsalicylic acids

When the methoxyphenylsulfones of Example 33 are demethylated as per Example 3, and the resulting phenols carbonated as per Example 7, the corresponding phenylsulfonylsalicylic acids are obtained.

When the corresponding phenylthiosalicylic acids of Example 7 are oxidized with peroxide in acetic acid solution the same substituted phenylsulfonyl salicylic acids are obtained.

EXAMPLE 35

The preparation of 5-(p-chlorophenylthio)-salicylanilide

A mixture of phenyl 5-(p-chlorophenylthio)salicylate (0.1 m.), aniline (0.1 m.) and 1-methylnaphthalene (50 ml.) is heated slowly to 230° C., kept at this temperature until phenol has stopped distilling, charcoal (2 g.) added, then 20 ml. additional 1-methylnaphthalene, heating continued 10 minutes, the mixture filtered hot and cooled. The collected anilide is then recrystallized yielding pure 5-(p-chlorophenylthio)-salicylanilide.

EXAMPLE 36

The preparation of 5-(p-chlorophenylthio)-salicylamide

A mixture of methyl 5-(p-chlorophenylthio)-salicylate and concentrated ammonium hydroxide (5× excess) is heated at 100° C. in a sealed tube for six hours. After cooling, water is added and the 5-(p-chlorophenylthio)-salicylamide collected.

When monomethylamine, dimethylamine, ethylamine, diethylamine, morpholine, piperidine, etc. are used in place of ammonium hydroxide, the corresponding amides are obtained.

EXAMPLE 37

The preparation of N,N-diethylaminoethyl 5-(p-chlorophenyl-(thio)-salicylate

To a mixture of 5-(p-chlorophenylthio)-salicylic acid (0.01 m.) and N,N-diethylethanolamine (0.01 m.) in anhydrous tetrahydrofuran (100 ml.) is added a solution of dicyclohexylcarbodiimide (0.01 m.) in a minimum of the same solvent. The mixture is stoppered, shaken well, and allowed to stand overnight. The precipitated dicyclohexylurea is removed by filtration, the filtrate concentrated in vacuo, the residue partitioned between ether and 1 N hydrochloric acid the layers separated, the aqueous layer washed once with fresh ether and neutralized with saturated bicarbonate solution. Extraction with chloroform, followed by removal of the chloroform in vacuo (high vacuum pump to remove traces of starting amine) yields N,N - diethylaminoethyl 5 - (p - chlorophenylthio)-salicylate.

EXAMPLE 38

The preparation of sodium 5-(p-chlorophenylthio)-salicylate

Solutions of 5-(p-chlorophenylthio)-salicylic acid in methanol and sodium hydroxide (1 equivalent) in water are mixed, heated for solution, filtered and the filtrate concentrated in vacuo to leave sodium 5-(p-chlorophenylthio)-salicylate.

When potassium hydroxide is used in place of sodium hydroxide in the above example, the corresponding potassium salt is obtained.

When two equivalents of the above bases are used, the corresponding di-sodio and di-potassio-salts are obtained.

EXAMPLE 39

The preparation of the diethylaminoethanol salt of 5-(p-chlorophenylthio)-salicylic acid To a stirred solution of 5-(p-chlorophenylthio)-salicylic acid (0.001 m.) in chloroform-methanol is added an ether solution (10 ml.) of N,N-diethylaminoethanol (0.001 m.), the resultant mixture stirred one hour, the salt collected or the solvent removed in vacuo to yield the diethylaminoethanol' salt of 5-(p-chlorophenylthio)-salicylic acid.

When piperidine, morpholine, triethylamine, N-methylpiperidine, N-methylmorpholine, tributylamine, or other organic amines are used in place of diethylaminoethanol in the above example, the corresponding salt is obtained.

We claim:

1. A method of treating inflammation which comprises administering to a host 1 mg. to 100 mg. per kg. body weight per day of a compound of the formula:

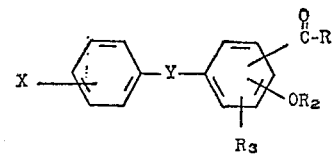

wherein

X is halogen;

Y is thio, sulfinyl, or sulfonyl;

R is hydroxy;

$R_2$ is hydrogen; and $R_3$ is hydrogen or a pharmaceutically non-toxic addition salt, thereof;

provided that $OR_2$ group is always ortho to the

group.

2. A method of treating inflammation according to claim 1 wherein the compound to be administered is 5-(p-fluorophenylsulfonyl)-salicylic acid.

3. A method of treating inflammation according to claim 1 wherein the compound to be administered is 4-(p-fluorophenylthio)-salicylic acid.

4. A method of treating inflammation according to claim 1 wherein the compound to be administered is 5-(o-fluorophenylthio)-salicylic acid.

5. A method of treating inflammation according to claim 1 wherein the compound to be administered is 4-(m-fluorophenylsulfinyl)-salicylic acid.

References Cited
UNITED STATES PATENTS 2,077,529   4/1937   Moderson ---------- 260—520
3,105,090   9/1963   Leonard.

STANLEY J. FRIEDMAN, Primary Examiner

U.S. Cl. X.R.

260—520